United States Patent [19]

Balentine

[11] Patent Number: 5,360,201

[45] Date of Patent: Nov. 1, 1994

[54] HOLE AND CIRCLE TORCH CUTTING ATTACHMENT

[76] Inventor: Darrell G. Balentine, 627 N. First, Merkel, Tex. 79536

[21] Appl. No.: 61,198

[22] Filed: May 13, 1993

[51] Int. Cl.$^5$ .............................................. B23K 7/10
[52] U.S. Cl. ......................................... 266/70; 266/48
[58] Field of Search ...................... 266/48, 53, 62, 63, 266/68, 70, 71, 72

[56] References Cited

U.S. PATENT DOCUMENTS

| | | | |
|---|---|---|---|
| 1,780,814 | 11/1930 | Cregger | 266/70 |
| 2,852,245 | 9/1958 | Lamb | 266/70 |
| 3,139,471 | 6/1964 | Root | 266/70 |
| 3,170,015 | 2/1965 | Ziebart | 266/70 |
| 3,514,087 | 5/1970 | Richards | 266/70 |
| 4,621,792 | 11/1986 | Thurston | 266/70 |

Primary Examiner—Scott Kastler
Attorney, Agent, or Firm—John R. Flanagan

[57] ABSTRACT

A hole and circle cutting attachment for use with a cutting torch includes an elongated rigid rod, an elongated pointer and elements for adjustably mounting the pointer at one end portion of the rod and extending in a generally transverse orientation relative to the rod. The cutting attachment also includes a body part having elements for adjusting the body part to any position along the rod and toward and away from the pointer and for releasably clamping on the rod. The cutting attachment further includes a clamp part mounted to the body part and adjustable relative thereto for securing a torch tip of the cutting torch between the body and clamp parts.

15 Claims, 1 Drawing Sheet

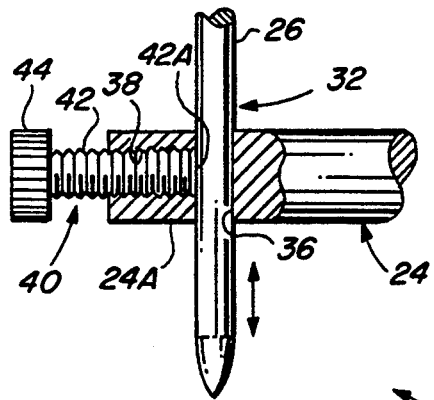
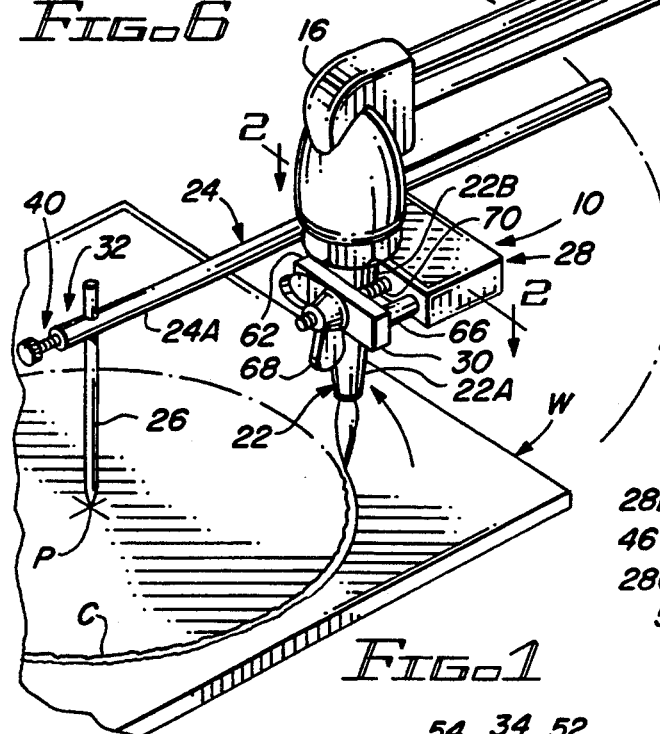
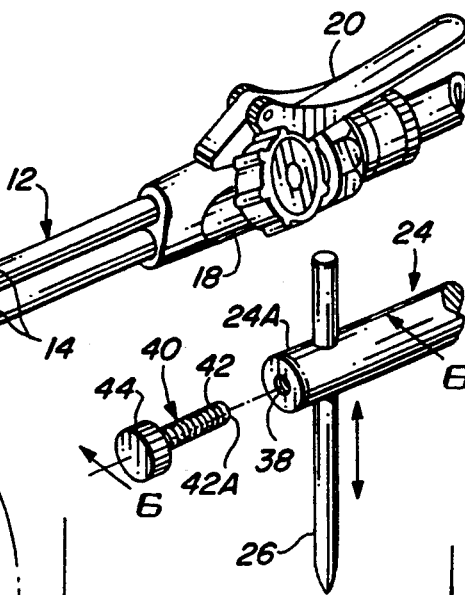
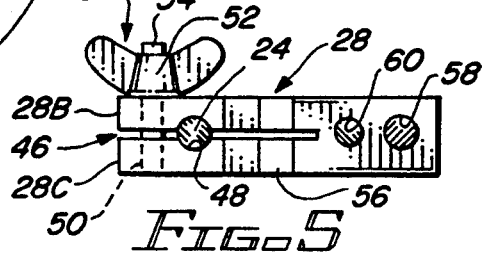
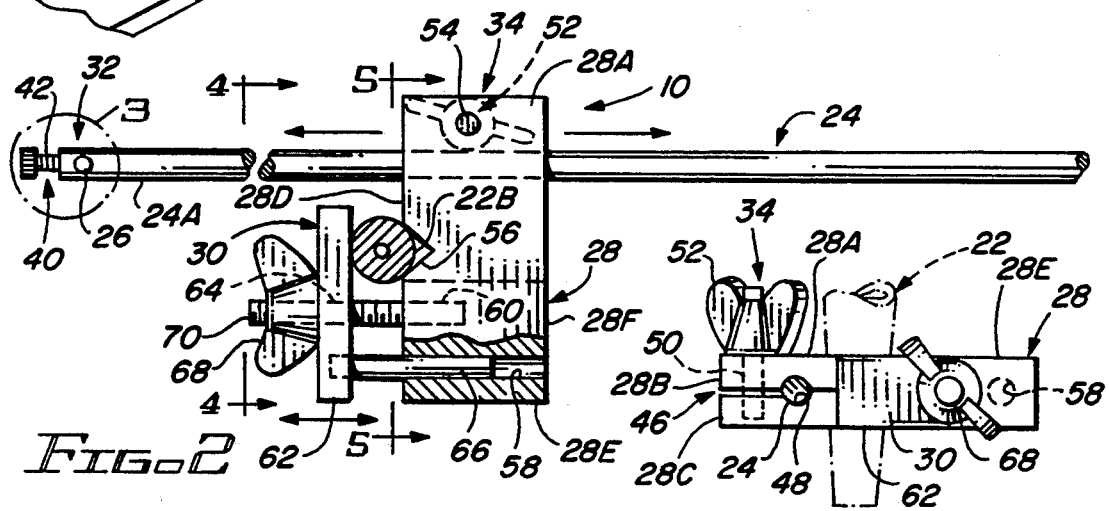
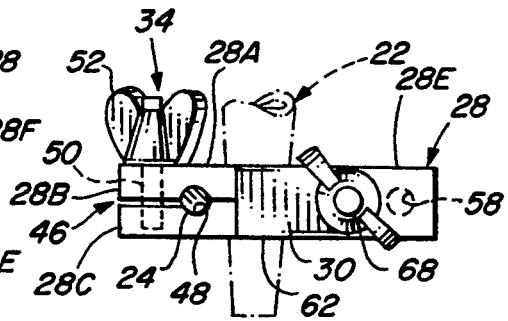

HOLE AND CIRCLE TORCH CUTTING ATTACHMENT

BACKGROUND OF THE INVENTION

1. Field of the Invention

The present invention generally relates to attachments for cutting torches and, more particularly, is concerned with an torch attachment for cutting holes and circles with such cutting torches.

2. Description of the Prior Art

One difficult skill to be acquired by a welder is to cut circles to close tolerances with a cutting torch. Prior art guide attachment devices have been proposed in an attempt to mechanize the cutting of circles and reduce the amount of skill required. Representative examples of these prior art devices are the those disclosed in Lamb U.S. Pat. No. 2,852,245, Root U.S. Pat. No. 3,139,471, Ziebart U.S. Pat. No. 3,170,015, and Richards U.S. Pat. No. 3,514,087.

However, none of these prior art devices appear to be an adequate solution to the circle cutting problem. They all suffer from the following limitations. They are quite complex and difficult to adjust and therefore add to the user's burden by increasing rather than lessening the overall skill required. Their accuracy is limited by virtue of the inherent play from the complexity of the parts being utilized.

Consequently, a need still exists for the provision of a circle cutting attachment for use with a welding or cutting torch which will overcome the above-mentioned limitations of the prior art devices without introducing a new set of limitations in their place.

SUMMARY OF THE INVENTION

The present invention provides a hole and circle torch cutting attachment designed to satisfy the aforementioned need. The cutting attachment of the present invention is versatile in that it will cut circles of a wide range of sizes, such as from 1 to 20 inches, fit different brands of cutting torches, and cut very accurately and precisely. Also, the cutting attachment is durable and inexpensive and simple to construct.

Accordingly, the present invention is directed to a hole and circle torch cutting attachment which comprises: (a) an elongated rigid rod; (b) an elongated pointer; (c) means for adjustably mounting the pointer at one end portion of the rod and extending in a generally transverse orientation relative to the rod; (d) a body part having means for adjusting the body part to any position along the rod toward and away from the pointer and for releasably clamping on the rod; and (e) a clamp part mounted to the body part and adjustable relative thereto for securing a torch tip thereon.

More particularly, the adjustable mounting means includes a first hole extending substantially transversely through the one end portion of the rod for receiving the pointer therethrough, a second hole threaded internally and extending substantially axially from an end of the rod through the one end portion of the rod and intersecting with the first hole, and a first fastener having a stem threaded externally so as to be threadable into the second hole of the rod for engaging with the portion of the pointer extending through the first hole and securing the pointer to the rod. The first fastener also has an enlarged head on one end of the stem to grip for turning the stem.

The body part adjusting and clamping means includes a slit defined through a first end portion of the body part from one end edge thereof toward and terminating short of another end edge of the body part being located opposite from the one end edge thereof so as to define a pair of clamp segments on the first end portion of the body part. The body part adjusting and clamping means also includes a first passageway extending through the first end portion of the body part substantially parallel to and through the slit for receiving the rod therethrough, a second passageway threaded internally and extending substantially transversely through the first end portion of the body part and intersecting with the slit and spaced from the first passageway, and a second fastener having a stem threaded externally so as to be threadable into the second passageway of the first end portion of the body part for flexing the clamp segments thereof toward and away from one another to selectively apply and release a clamping force on and from the portion of the rod extending through the first passageway.

The body part has a notch defined in one edge portion facing toward the clamp part and adapted to seat a side of the torch tip thereon, a bore extending through a second end portion of the body part and aligned substantially parallel to the rod from the one edge portion to an opposite edge portion of the body part, and a passage extending into the second end portion of the body part from the one edge portion thereof. The passage is threaded internally and disposed between and spaced from the notch and bore. The clamp part includes an elongated bar having an aperture extending therethrough and being threaded internally, and an elongated pin secured on one end portion of the bar and extending outwardly therefrom in a substantially transverse orientation thereto and being adapted to slidably fit into the bore of the body part. The clamp part also includes a third fastener having a stem threaded externally so as to be threadable through the aperture of the bar and into the passage of the second end portion of the body part. Selected rotation of the third fastener causes drawing of the bar toward and withdrawing of the bar away from the one edge of the body part for applying and releasing a clamping force to and from the torch tip seated in the notch between the bar and body part.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a hole and circle cutting attachment of the present invention mounting and guiding a conventional cutting torch.

FIG. 2 is a top plan view of the cutting attachment as seen along line 2—2 of FIG. 1.

FIG. 3 is an enlarged detailed fragmentary perspective view of the portion of the cutting attachment encompassed by the circle 3 in FIG. 2.

FIG. 4 is an enlarged elevational view, partly in section, of the cutting attachment as seen along line 4—4 of FIG. 2.

FIG. 5 is another enlarged elevational view, partly in section, of the cutting attachment as seen along line 5—5 of FIG. 2.

FIG. 6 is an enlarged side elevational view, partly in section, of the cutting attachment as seen along line 6—6 of FIG. 3.

DETAILED DESCRIPTION OF THE INVENTION

Referring to the drawings and particularly to FIGS. 1 to 3, there is illustrated a hole and circle cutting attachment of the present invention, being generally designated 10. The cutting attachment 10 is shown employed with a cutting torch 12 of conventional construction. The cutting torch has a pair of rigid gas supply tubes 14, a head 16 mounted to one end of the tubes 14, and a control valve 18 mounted to the other end of the tubes and actuated by pressing on a handle 20. The head 16 of the torch 12 has a nozzle tip 22 which typically has a tapered lower portion 22A and an upper straight or non-tapered portion 22B. The cutting attachment 10 of the present invention is adapted for mounting on the tip 22 and preferably on the non-tapered portion 22B thereof.

Basically, the cutting attachment 10 includes an elongated rigid cylindrical rod 24, an elongated cylindrical pointer 26, a body part 28, and a clamp part 30. Also, first means 32 is associated with the rod 24 for adjustably mounting the pointer 26 at one end portion 24A of the elongated rod 24 to extend in a generally transverse orientation relative to the rod 24. Further, second means 34 is associated with the body part 28 for adjusting the body part 28 to any position along the rod 24 toward and away from the pointer 26 and for releasably clamping on the rod 24. The clamp part 30 is mounted to the body part 28 and adjustable relative to it for securing the torch tip 22 between the body and clamp parts 28, 30.

More particularly, the first, or adjustable mounting, means 32 associated with the rod 24 and pointer 26 includes a first hole 36 which extends substantially transversely through the one end portion 24A of the rod 24 and a second hole 38 which is threaded internally and extends substantially axially from the end of the rod 24 through the one end portion of the rod and intersects with the first hole 36. The first hole 36 slidably receives the pointer 26 therethrough. The first means 32 also includes a first fastener 40 which has an elongated stem 42 threaded externally so as to be threadable into the second hole 38 of the rod 24 for engaging at an inner end 42A with the portion of the pointer 26 extending through the first hole 36 to secure the pointer 26 to the rod 24. The first fastener 40 also has an enlarged head 44 on one end of the stem 42 to grip for screwing the stem toward and away from the first hole 40. As seen in FIG. 1, the pointer 26 is set into a center punch mark P on a workpiece W to be cut and in such manner centers the cutting of the hole or circle C.

The second, or adjusting and clamping, means 34 on the body part 28 includes a generally planar split or slit 46 defined through a first end portion 28A of the body part 28, extending from one end edge thereof toward and terminating short of the opposite end edge thereof. The planar slit 46 separates the first end portion 28A of the body part 28 into a pair of clamp segments 28B, 28C.

The second means 34 also includes a first passageway 48 extending through the first end portion 28A of the body part 28 in an orientation substantially parallel to and through the planar slit 46. The rod 24 is slidably received through the first passageway 48 and in such manner can be adjusted to change the diameter of the hole or circle to be made employing the cutting attachment 10. The second means 38 further includes a second passageway 50 threaded internally and extending substantially transversely through the first end portion 28A of the body part 28 and crossing and intersecting with the slit 46 and spaced from the first passageway 48.

The second means 34 still further includes a second fastener 52 having a stem 54 threaded externally so as to be threadable into the second passageway 52. By selectively screwing or unscrewing the second fastener 52 into or from the second passageway 52, the clamp segments 28C, 28D are correspondingly flexed toward or away from one another which, in turn, contracts or expands the cross-sectional sizes of the slit 46 and first passageway 48 so as to selectively apply or release a clamping force on or from the portion of the rod 24 extending through the first passageway 48.

The body part 28 of the cutting attachment 10 has a notch 56 defined in the one edge portion 28D of the body part 28 which faces toward the clamp part 30. The notch 56 is adapted to seat a side of the torch nozzle tip 22 thereon. The body part 28 also has a bore 58 which extends through a second end portion 28E of the body part 28 and is aligned substantially parallel to the rod 24 from the one edge portion 28D to the opposite edge portion 28F of the body part 28, and a passage 60 which extends into the second end portion 28E of the body part 28 from the one edge portion 28D thereof. The passage 60 is threaded internally and disposed between and spaced from the notch 56 and bore 58.

The clamp part 30 of the cutting attachment 10 includes an elongated rectangular bar 62 which has an aperture 64 extending therethrough and is threaded internally, and an elongated pin 66 secured on one end portion of the bar 62 which extends outwardly therefrom in a substantially transverse orientation thereto and is adapted to slidably fit into the bore 58 of the body part 28. The clamp part 30 also includes a third fastener 68 which has a stem 70 threaded externally so as to be threadable through the aperture 64 of the bar 62 and into the passage 60 of the second end portion 28E of the body part 28. Selected rotation of the third fastener 68 screws it into and from the aperture 64, causing drawing of the bar 62 toward and withdrawing of the bar 62 away from the one edge portion 28D of the body part 28 for applying and releasing a clamping force to and from the torch tip 22 seated in the notch 56 between the bar 62 and body part 28.

The cutting attachment 10 can be setup to work in two different ways. For cutting small circles, the clamp part 30 is tightened only until snug to allow the cutting attachment 10 to swivel on the torch tip 22. The unused portion of the rod 24 extending from the body part 28 is available to be used as an arm to rotate the cutting attachment 10 on the torch tip 22. For larger circles, the pointer 26 is located under the cutting torch 12. The clamp part 30 is then tightened until rigid. The pointer 26 then provides a stable point to rotate the entire torch 12.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A hole and circle cutting attachment for use with a cutting torch, comprising:
   (a) an elongated rigid rod;
   (b) an elongated pointer;
   (c) means for adjustably mounting said pointer at one end portion of said rod and extending in a generally transverse orientation relative to said rod, said adjustable mounting means including
      (i) a first hole extending substantially transversely through said one end portion of said rod for receiving said pointer therethrough,
      (ii) a second hole extending substantially axially from an end of said rod through said one end portion of said rod, said second hold intersecting with said first hole, said one end portion of said rod being threaded internally within said second hole thereof, and
      (iii) a first fastener having a stem being threaded externally so as to be threadable into said second hole of said rod for engaging the portion of said pointer extending through said first hole and securing said pointer to said rod, said fastener also having an enlarged head on one end of said stem to grip for turning said stem;
   (d) a body part having means for adjusting said body part to any position along said rod and toward and away from said pointer and for releasably clamping on said rod; and
   (e) a clamp part mounted to said body part and adjustable relative thereto for securing a torch tip of a cutting torch between said body and clamp parts.

2. The cutting attachment of claim 1 wherein said adjusting and clamping means of said body part includes a slit defined through a first end portion of said body part from one edge thereof toward and terminating short of another edge of said body part being located opposite from said one edge thereof so as to define a pair of clamp segments on said first end portion of said body part.

3. The cutting attachment of claim 2 wherein said adjusting and clamping means of said body part also includes a first passageway extending through said first end portion of said body part substantially parallel to and through said slit for receiving said rod therethrough.

4. The cutting attachment of claim 3 wherein said adjusting and clamping means of said body part further includes a second passageway extending substantially transversely through said first end portion of said body part and intersecting with said slit and spaced from said first passageway, said second passageway being threaded internally.

5. The cutting attachment of claim 4 wherein said adjusting and clamping means of said body part also includes a second fastener having a stem being threaded externally so as to be threadable into said second passageway of said first end portion of said body part for flexing said clamp segments thereof toward and away from one another to apply and release a clamping force on and from said portion of said rod extending through said first passageway.

6. A hole and circle cutting attachment for use with a cutting torch, comprising:
   (a) an elongated rigid rod;
   (b) an elongated pointer;
   (c) means for adjustably mounting said pointer at one end portion of said rod and extending in a generally transverse orientation relative to said rod;
   (d) a body part having a first end portion defining means for adjusting said body part to any position along said rod and toward and away from said pointer and for releasably clamping on said rod; and
   (e) a clamp part mounted to said body part and adjustable relative thereto for securing a torch tip of a cutting torch between said body and clamp parts;
   (f) said body part also having
      (i) a notch defined in one edge portion facing toward said clamp part being adapted to seat a side of the torch tip thereon,
      (ii) a bore extending through a second end portion of said body part substantially parallel to said rod from said one edge portion to an opposite edge portion of said body part; and
      (iii) a passage extending into said second end portion of said body part from said one edge portion thereof, said passage being threaded internally and disposed between and spaced from said notch and said bore.

7. The cutting attachment of claim 6 wherein said adjustable mounting means includes a first hole extending substantially transversely through said one end portion of said rod for receiving said pointer therethrough.

8. The cutting attachment of claim 7 wherein said adjustable mounting means also includes a second hole extending substantially axially from an end of said rod through said one end portion of said rod, said second hold intersecting with said first hole, said one end portion of said rod being threaded internally within said second hole thereof.

9. The cutting attachment of claim 8 wherein said adjustable mounting means further includes a first fastener having a stem being threaded externally so as to be threadable into said second hole of said rod for engaging the portion of said pointer extending through said first hole and securing said pointer to said rod, said fastener also having an enlarged head on one end of said stem to grip for turning said stem.

10. The cutting attachment of claim 6 wherein said clamp part includes:
    an elongated bar having an aperture extending therethrough and being threaded internally in said aperture;
    an elongated pin secured on one end portion of said bar and extending outwardly therefrom in a substantially transverse orientation thereto and being adapted to slidably fit into said bore of said body part; and
    a third fastener having a stem being threaded externally so as to be threadable through said aperture of said bar and into said passage of said second end portion of said body part and being operable for drawing said bar toward and withdrawing said bar away from said one edge of said body part for applying and releasing a clamping force to and from the torch tip seated in said notch between said bar and said body part.

11. The cutting attachment of claim 10 wherein said adjustable mounting means includes a first hole extending substantially transversely through said one end portion of said rod for receiving said pointer therethrough.

12. The cutting attachment of claim 11 wherein said adjustable mounting means also includes a second hole extending substantially axially from an end of said rod through said one end portion of said rod, said second hold intersecting with said first hole, said one end portion of said rod being threaded internally within said second hole thereof.

13. The cutting attachment of claim 12 wherein said adjustable mounting means further includes a first fastener having a stem being threaded externally so as to be threadable into said second hole of said rod for engaging the portion of said pointer extending through said first hole and securing said pointer to said rod, said fastener also having an enlarged head on one end of said stem to grip for turning said stem.

14. The cutting attachment of claim 13 wherein said adjusting and clamping means of said body part includes a slit defined through a first end portion of said body part from one edge thereof toward and terminating short of another edge of said body part being located opposite from said one edge thereof so as to define a pair of clamp segments on said first end portion of said body part.

15. The cutting attachment of claim 14 wherein said adjusting and clamping means of said body part also includes:
- a first passageway extending through said first end portion of said body part substantially parallel to and through said slit for receiving said rod therethrough;
- a second passageway extending substantially transversely through said first end portion of said body part and intersecting with said slit and spaced from said first passageway, said second passageway being threaded internally; and
- a second fastener having a stem being threaded externally so as to be threadable into said second passageway of said first end portion of said body part for flexing said clamp segments thereof toward and away from one another to apply and release a clamping force on and from said portion of said rod extending through said first passageway.

* * * * *